United States Patent [19]

Okamoto

[11] 3,926,142

[45] Dec. 16, 1975

[54] METER
[75] Inventor: Keiji Okamoto, Fujieda, Japan
[73] Assignee: Yazaki Sogyo Kabushiki Kaisha, Tokyo, Japan
[22] Filed: Oct. 4, 1974
[21] Appl. No.: 512,218

[30] Foreign Application Priority Data
Dec. 14, 1973 Japan.................. 48-141747[U]

[52] U.S. Cl. .............. 116/116; 73/509; 116/129 H; 116/129 T; 116/DIG. 37
[51] Int. Cl.² ........................................... G01P 1/08
[58] Field of Search... 116/129 R, 116, 57, DIG. 37, 116/133, 129 H, 129 T, DIG. 46; 73/509

[56] References Cited
UNITED STATES PATENTS

| | | | |
|---|---|---|---|
| 780,117 | 1/1905 | Morris | 116/133 |
| 2,629,951 | 3/1953 | Kittridge | 116/133 |
| 2,798,454 | 7/1957 | Gleeson | 116/116 |
| 2,910,037 | 10/1959 | Hastings | 116/133 |
| 3,807,350 | 4/1974 | Powell | 116/129 R |

Primary Examiner—Donald O. Woodiel
Assistant Examiner—Marcus S. Rasco
Attorney, Agent, or Firm—Oldham & Oldham Co.

[57] ABSTRACT

A meter for use in a multi-speed vehicle for indicating both the rotating speed of the engine and the running speed of the vehicle by a single pointer. The meter comprises a character drum of polygonal cross section, and speed scales corresponding to individual gear positions of the multi-speed vehicle are provided on the different side faces of this character drum. This character drum is suitably rotated to expose the desired one only of the speed scales in a display window formed in the dial of the meter so as to prevent the operator from reading other speed scales.

3 Claims, 10 Drawing Figures

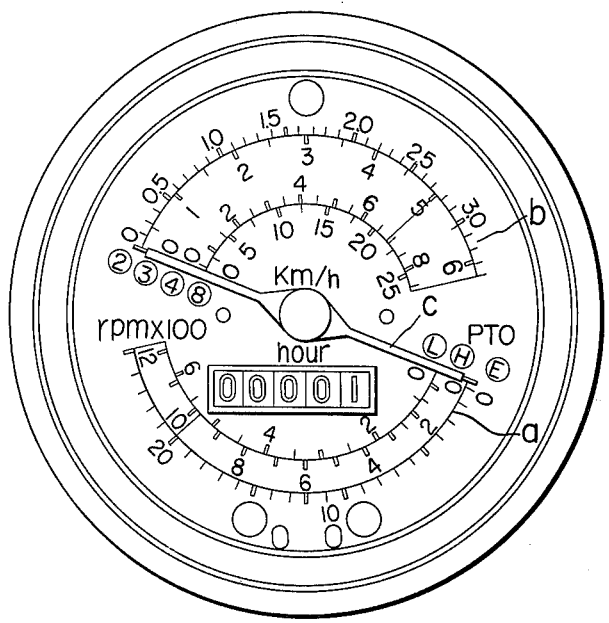

METER

BACKGROUND OF THE INVENTION

This invention relates to a meter for use in a multi-speed vehicle for indicating both the rotating speed of the engine and the running speed of the vehicle by a single pointer.

In the field of modern agricultural vehicles, a single agricultural vehicle can serve various services such as digging and turnup of earth, crushing of clods, mowing of rice plants and conveying of mowed rice plants by merely replacing the attachement. In such an agricultural vehicle, one of the gear positions suitable for the desired service is selected so that the desired operation can be carried out at the desired vehicle speed.

A meter as shown in FIG. 1 is commonly employed in such an agricultural vehicle, and in this meter, a speed display $a$ indicating the rotating speed of the engine and a speed display $b$ indicating the running speed of the vehicle are disposed on the same dial of the meter. The structure of this meter is such that a conventional mechanical speedometer and a conventional mechanical tachometer are incorporated in an upper part and a lower parts respectively of a meter body, and a single pointer $c$ is mounted on a pointer shaft for simultaneously giving the indications of both the tachometer and the speedometer thereby indicating the running speed of the vehicle relative to the rotating speed of the engine.

In the agricultural vehicle provided with such a meter, a specific gear position is selected depending on the intended service as described above, and thus, the speed of the vehicle differs depending on the desired operation in spite of the fact that the rotating speed of the engine may be the same. Therefore, the speed display $a$ disposed at the upper part of the dial includes various speed scales corresponding to the individual gear positions. Generally, four or five speeds or gear positions are provided although the number of such speeds or gear positions varies depending on the specifications of agricultural vehicles. Further, in some kinds of agricultural vehicles, a shift to high or low gear is also feasible.

Thus, in the prior art meter of this kind, many speed scales or zones or four to five speed scales at the least are provided in close proximity to each other on a limited area of the upper part of the single dial. This prior art meter has therefore been defective in that it is very difficult for the operator to read the operating speed of the vehicle and he fails to get the correct reading frequently.

SUMMARY OF THE INVENTION

It is an object of the present invention to provide a meter of the kind above described in which a speed scale indicating the running speed of a vehicle at a selected gear position can only be displayed on the dial so as to eliminate the prior difficulty and failure to read the operating speed of the vehicle.

Another object of the present invention is to provide a meter of the kind above described in which means are provided for accurately positioning and maintaining a character drum in proper position even when vibrations of the vehicle engine and vibrations of the vehicle body due to running on an irregular ground surface are imparted thereto.

In accordance with one aspect of the present invention which attains the first object above described, there is provided a meter for use in a multi-speed vehicle for indicating both the rotating speed of the engine and the running speed of the vehicle by a single pointer, comprising a meter body, a dial, a display window formed in said dial, a character drum of polygonal cross section incorporated within said meter body and provided on a plurality of side faces thereof with respective speed scales corresponding to the individual gear positions of said vehicle, and means for causing rotation of said character drum so that the speed scale corresponding to the specific gear position with which said vehicle is operating can solely be exposed in said display window.

In accordance with another aspect of the present invention which attains the second object above described, there is provided a meter of the above character wherein a pair of spring means are provided for holding one end of said character drum therebetween while permitting rotation of said drum so as to maintain said character drum in one of a plurality of predetermined positions.

Other objects, features and advantages of the present invention will become apparent from the following detailed description of a preferred embodiment thereof taken in conjunction with the accompanying drawings.

BRIEF DESCRIPTION OF THE DRAWINGS

FIG. 1 is a front elevation of a prior art meter.

FIG. 2 is a front elevation of an embodiment of the meter according to the present invention.

FIGS. 3a, 3b and 3c are schematic perspective views of three different forms of a character drum preferably employed in the meter according to the present invention.

FIG. 4 is a schematic perspective view of one form of means for causing rotation of the character drum shown in FIG. 3a.

DESCRIPTION OF THE PREFERRED EMBODIMENT

Figure 4:
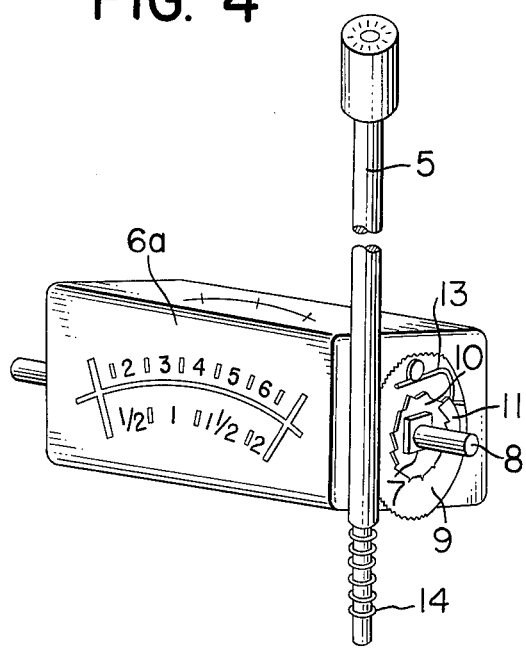

Referring to FIG. 2, a meter according to the present invention comprises a speed scale 1 provided at a lower part of a dial for indicating the rotating speed of the engine of a vehicle, a single pointer 2, a display window 3 formed in the dial for displaying another speed scale indicating the running speed of the vehicle, another display window 4 for displaying the gear position, and a push knob 5 which can be depressed at the exterior of the meter.

FIGS. 3a, 3b and 3c show character drums 6a, 6b and 6c of square cross section, pentagonal cross section and hexagonal cross section used for vehicles of four speeds, five speeds and six speeds respectively. Thus, these character drums 6a, 6b and 6c are provided on the different side faces thereof with speed scales corresponding to the individual gear positions. One of these character drums is incorporated in the meter to be rotated in response to the depression of the push knob 5, so that any desired one of the speed scales can be exposed in the display window 3 shown in FIG. 2.

FIGS. 4 to 8 show one form of means for causing rotation of, for example, the character drum 6a shown in FIG. 3a in response to the depression of the push knob 5 shown in FIG. 2.

Referring to FIGS. 4 to 8, one of the axial ends of the character drum 6a is formed with an integral end extension 7 of square cross section. A drum shaft 8 extends through and is fixed to the character drum 6a. A driving gear 9 is freely rotatably mounted on the drum end extension 7. In response to the depression of the push knob 5 in a direction as shown by the arrow B in FIG. 5, the driving gear 9 meshes with a rack 5a formed on a lower part of the push knob 5 to be rotated in a direction as shown by the arrow C in FIG. 5. A ratchet wheel 10 is fixedly mounted on the drum end extension 7. A ratchet pawl 11 is fixed to the driving gear 9 by an anchoring pin 12. A ratchet spring 13 engages at one end thereof with the ratchet pawl 11 and at the other end thereof with the driving gear 9 so as to normally urge the ratchet pawl 11 in a direction in which the ratchet pawl 11 engages firmly with the ratchet wheel 10. The push knob 5 is received at the lower end thereof in an opening of bored in a portion 15a of a frame member and is normally urged upward in FIG. 5 by a coil spring 14. The biasing force of this coil spring 14 is selected to be greater than that of the ratchet spring 13.

Figure 5:
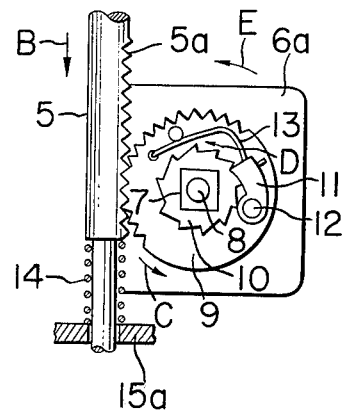
FIG. 5 is a side elevation of FIG. 4.

In operation, the rack 5a formed on the push knob 5 is brought into meshing engagement with the driving gear 9 to rotate the driving gear 9 in the direction of the arrow C in FIG. 5 in response to the depression of the push knob 5 in the direction of the arrow B. This rotation of the driving gear 9 causes rotation of the ratchet wheel 10 through the ratchet pawl 11 in a direction as shown by the arrow D in FIG. 5. The ratchet wheel 10 is rotated until the desired speed scale on the character drum 6a is exposed in the display window 3 shown in FIG. 2. After the exposure of the desired speed scale in the display window 3, the force imparted to the push knob 5 is released to return the push knob 5 to the original position by the force of the coil spring 14. Due to the fact that the biasing force of the coil spring 14 is selected to be greater than that of the ratchet spring 13, the ratchet pawl 11 slips over the teeth of the ratchet wheel 10 and the driving gear 9 is rotated in a direction opposite to the direction C to be restored to the original position independently of the character drum 6a which remains in the rotated position.

Figure 6:
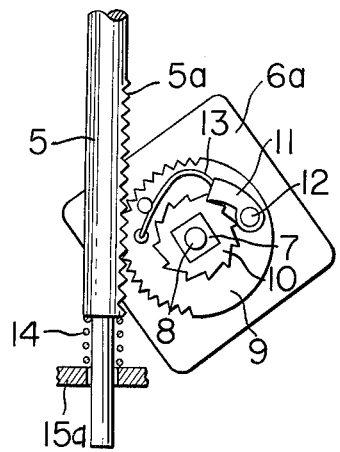
FIG. 6 is a view similar to FIG. 5 but showing an undesirable position of the character drum.
Figure 7:
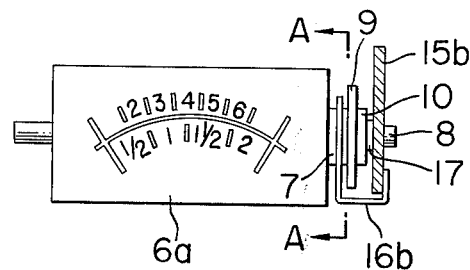
FIG. 7 is a front elevation of FIG. 4 in the state in which a pair of springs are mounted for positioning and maintaining the character drum in a predetermined position.
Figure 8:
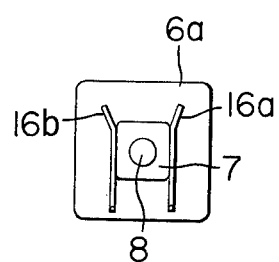
FIG. 8 is a side elevation of FIG. 7 when viewed along the line A—A in FIG. 7.

In the meter according to the present invention, a pair of wire-like springs 16a and 16b are anchored at one end thereof to another portion 15b of the frame member so as to hold the square-shaped end extension 7 of the character drum 6a between the other end portions thereof while permitting rotation of the character drum 6a as shown in FIGS. 7 and 8. These springs 16a and 16b prevent swinging movement of the character drum 6a under the influence of vibrations of the vehicle engine and vibrations of the vehicle body due to running of the vehicle on an irregular ground surface. Further, these springs 16a and 16b act to prevent the character drum 6a from stopping in an undesirable position as seen in FIG. 6 as when the manipulation of the push knob 5 is ceased in the midway of the desired stroke. Thus, the character drum 6a can be restored reliably by the force of these springs 16a and 16b to the predetermined normal position even when it takes an undesirable position as shown in FIG. 6, and the character drum 6a is also prevented from swinging due to vibrations. The reference numeral 17 in FIG. 7 designates an adjusting washer.

It will be understood from the foregoing detailed description that the meter according to the present invention is featured by the fact that a character drum of polygonal cross section is provided on a plurality of side faces thereof with respective speed scales representing individual speeds of a multi-speed vehicle and is suitably rotated so that any desired one of these speed scales can be solely exposed in a display window formed in a dial and the remaining unnecessary speed scales cannot appear on the dial. Therefore, the operator driving the vehicle can easily and accurately read the operating speed of the vehicle without reading the other unnecessary speed scales.

While a preferred embodiment of the present invention has been described in detail, it is apparent that the present invention is in no way limited to such specific embodiment and many changes and modifications may be made therein without departing from the spirit of the present invention.

For example, various suitable other means may be employed for causing rotation of the character drum. As an example, means including a rotary knob, a worm gear and a helical gear may be provided to cause rotation of the character drum. As another example, means such as a mechanical linkage arranged for interlocking operation with the change lever or an electrical control circuit including a switch arranged for interlocking relation with the change lever may be provided so that the character drum can be automatically rotated simultaneously with the shift of the gear position.

What is claimed is:

1. A meter for use in a multi-speed vehicle for indicating both the rotating speed of the engine and the running speed of the vehicle by a single pointer, comprising a meter body, a dial, a display window formed in said dial, a character drum of polygonal cross section incorporated within said meter body and provided on a plurality of side faces thereof with respective speed scales corresponding to the individual gear positions of said vehicle, means for causing rotation of said character drum so that the speed scale corresponding to the specific gear position at which said vehicle is operating can solely be exposed in said display window, said means for causing rotation of said character drum including a push knob at the exterior of said meter body adapted to be moved linearly, means for converting linear movement of said push knob into rotating movement of rotary elements thereby causing rotation of said character drum, said converting means including a ratchet wheel fixed to one end of said character drum, a ratchet pawl urged in response to the linear movement of said push knob thereby causing rotation of said ratchet wheel, and a ratchet spring urging said ratchet pawl toward said ratchet wheel to maintain firm engagement therebetween.

2. A meter as in claim 1 where said converting means include a gear rotatably carried on said character drum, a rack gear on said push knob engaging said gear, and said ratchet pawl being pivotally positioned on said gear to engage said ratchet wheel and move it in one direction.

3. A meter as claimed in claim 2 wherein a pair of parallel spring means are provided for engaging and holding one end of said character drum therebetween while permitting rotation of said drum so as to position said character drum normally in any one of a plurality of predetermined positions.

* * * * *